United States Patent
Kwak (10) Patent No.: US 9,646,305 B2
(45) Date of Patent: May 9, 2017

(54) PAYMENT SERVICE METHOD USING INTEGRATED BARCODE AND SERVICE APPARATUS THEREOF

(71) Applicant: SK PLANET CO., LTD., Seongnam-si, Gyeonggi-do (KR)

(72) Inventor: Sebyung Kwak, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 14/975,008

(22) Filed: Dec. 18, 2015

(65) Prior Publication Data
US 2016/0196548 A1    Jul. 7, 2016

(30) Foreign Application Priority Data
Jan. 6, 2015 (KR) .................. 10-2015-0001041

(51) Int. Cl.
*G06K 19/00* (2006.01)
*G06Q 20/38* (2012.01)
*G06Q 20/32* (2012.01)

(52) U.S. Cl.
CPC ....... *G06Q 20/385* (2013.01); *G06Q 20/3276* (2013.01)

(58) Field of Classification Search
CPC ............ G06Q 20/346; G06Q 20/3274; G06Q 20/3276
USPC ........................ 235/375, 487, 494
See application file for complete search history.

(56) References Cited

U.S. PATENT DOCUMENTS

| 2006/0054695 | A1* | 3/2006 | Owada ................ | G06K 7/1095 235/440 |
| 2009/0204530 | A1* | 8/2009 | Hanson ................ | G06Q 20/10 705/35 |
| 2012/0245985 | A1* | 9/2012 | Cho ..................... | G06Q 20/16 705/14.23 |
| 2013/0018758 | A1* | 1/2013 | Balasubramanian | G06Q 20/3276 705/26.41 |
| 2015/0095222 | A1* | 4/2015 | Narendra .......... | G06Q 20/3278 705/41 |
| 2016/0125401 | A1* | 5/2016 | Li ........................ | G06Q 10/04 235/380 |

\* cited by examiner

*Primary Examiner* — Paultep Savusdiphol
(74) *Attorney, Agent, or Firm* — Hauptman Ham, LLP

(57) ABSTRACT

Provided are a payment service system, a payment service apparatus and method thereof. A personal barcode is issued for each user, an integrated barcode is generated by mapping the personal barcode with a product barcode, and the integrated barcode is changed for a preset period by setting the integrated barcode to only be valid during a preset period when performing a payment using the integrated barcode. Accordingly, security can be improved.

10 Claims, 6 Drawing Sheets

PAYMENT SERVICE METHOD USING INTEGRATED BARCODE AND SERVICE APPARATUS THEREOF

CROSS-REFERENCE TO RELATED APPLICATION

This application claims priority to and the benefit of Korean Patent Application No. 10-2015-0001041 filed in the Korean Intellectual Property Office on Jan. 6, 2015, the entire contents of which are incorporated herein by reference.

TECHNICAL FIELD

The following description relates to a payment service method using an integrated barcode and a service apparatus thereof, and more particularly, to a payment service method using an integrated barcode for increasing security by performing a payment using an integrated barcode, which is dynamically changed according to a time when performing the payment using the integrated barcode, including a personal barcode which includes payment means information and a product barcode which includes information related to a product for which payment will be to performed, and a service apparatus thereof.

BACKGROUND

According to developments of a mobile communication network and a specification of a terminal, a mobile communication terminal is beyond a scope of a simple communication device or an information providing device and became an essential belonging of a modern person, and is in a trend of evolving as a total entertainment device. Particularly, the mobile communication terminal which is the essential belonging of the modern person has become miniaturized and lightened through continuous developments, and is being reborn as a composite communication terminal combining various functions.

The mobile communication terminal may provide a barcode recognition function, through which a barcode attached to a product which may be recognized as product information when read by a cash register or a barcode scanner included in a point-of-sale (POS) system of a large store, and is being usefully used for automatically arranging sales data. A code scheme may be extended from a one-dimensional arrangement to a two-dimensional arrangement, and since information contained therein is dramatically increasing day by day, a scope of use of the code scheme is expanding.

Meanwhile, when a customer purchases a product in a specific store, the product barcode is read through the POS terminal in the store, a product payment is performed by finding a card having a discount benefit among cards the customer has, and presenting the card to a clerk.

Accordingly, technology for performing the payment using an integrated barcode mapping every user-selectable payment means is being developed.

However, currently, a problem of great vulnerability to security since the integrated barcode is used by being stored in a mobile device such as a mobile phone exists.

Further, much time is consumed for purchasing since each product's barcode is read by the clerk for the customer to purchase a specific product.

Accordingly, a demand for development of a way to use an integrated barcode with enhanced security when purchasing a product using the integrated barcode, and of performing a more rapid and convenient payment service when purchasing the product is being increased.

SUMMARY

The present invention is directed to providing a payment service method using an integrated barcode capable of performing a more rapid and convenient payment service when purchasing a product, and a service apparatus thereof.

Further, the present invention is directed to providing a payment service method using an integrated barcode for allowing to perform a payment service using the integrated barcode which is dynamically changed according to a time when performing the payment using the integrated barcode capable of performing a more rapid and convenient payment when purchasing a product, and a service apparatus thereof.

One aspect of the present invention provides a service apparatus, including a service communication unit configured to communicate with at least one terminal and a payment apparatus, and transceive data related to a payment service, and a control unit configured to receive information needed for generating a personal barcode from the terminal, generate the personal barcode by combining the received information, generate an integrated barcode by mapping the generated personal barcode with a product barcode for at least one product and set the integrated barcode to only be valid during a preset time when generating the integrated barcode, generate the integrated barcode for each preset period until payment-related information using the integrated barcode for the terminal is received from the payment apparatus, and control to provide the integrated barcode to the terminal.

Here, the integrated barcode may include a valid barcode for setting to only be valid during the preset time, and the valid barcode may be a code which is randomly generated according to a preset program.

Also, the personal barcode may include an additional payment information code and a payment means code, the additional payment information code may include at least one of discount card information applied to a purchase cost and mileage accumulation card information, and the payment means code may include at least one among credit card information, check card information, gift card information, prepaid card information, and bank and account information for account transfer, for a product payment.

Further, the service apparatus may further include a service storage unit configured to store the personal barcode generated for each user and user information for each user of a terminal by reflecting priority information related to a user's preference of use with respect to discount card information, point accumulation information for each card, mileage accumulation information, and payment means information corresponding to a credit card, a check card, a gift card, account transfer information, and bank and account information for account transfer.

Yet another aspect of the present invention provides a payment service method using an integrated barcode, including a service apparatus receiving information needed for generating a personal barcode from at least one terminal, generating the personal barcode using the information needed for generating the received personal barcode, registering and managing the generated barcode, the information needed for generating the personal barcode, and user information, for each person, searching for the personal barcode for a corresponding user when a signal for a request of an integrated barcode and a product barcode are received from the terminal, generating the integrated barcode by mapping the searched personal barcode with a product barcode for at least one product, and transmitting the generated integrated barcode to the terminal, wherein the integrated barcode is set to be valid only during a preset time when generating the integrated barcode, and the integrated barcode is generated for each preset period until payment-related information using the integrated barcode for the terminal is received, and is provided to the terminal.

Also, the receiving of the information needed for generating the personal barcode in the payment service method using the integrated barcode may include the service apparatus requesting information related to one or more among discount card information, point accumulation information for each card, mileage accumulation card information, and payment means information corresponding to a credit card, a check card, a gift card, account transfer information, to the terminal, and receiving the information from the terminal as a response to the request.

Further, the receiving of the information needed for generating the personal barcode in the payment service method using the integrated barcode may include the service apparatus confirming priority information related to a user's preference of use with respect to the payment means information from the terminal, and setting a payment ranking by reflecting the priority information which is preset.

Moreover, the payment service method using the integrated barcode, after the transmitting of the integrated barcode, may further include the service apparatus providing requested information to a payment apparatus when a request for information related to the integrated barcode is received from the payment apparatus, wherein the information related to the integrated barcode includes at least one of discount means information corresponding to discount card information, point accumulation information for each card, mileage accumulation card information, which are stored corresponding to a personal barcode included in the integrated barcode, and payment means information corresponding to a credit card, a check card, a gift card, and account transfer information.

Here, the information related to the integrated barcode may include priority information with respect to a payment means which a user prefers, or information related to discount card preference according to whether remaining points exist.

Also, yet another aspect of the present invention provides a payment service method using an integrated barcode, including registering information needed for generating a personal barcode in a service apparatus so a terminal receives a payment service using an integrated barcode, transmitting a signal for a request of an integrated barcode to the service apparatus and recognizing a barcode for a specific product according to a manipulation of a user when there is an input for the request of the integrated barcode from a user, and transmitting the recognized product barcode together with the signal for the request of the integrated barcode, storing the integrated barcode when the integrated barcode is received from the service apparatus, and performing a payment using the received integrated barcode which is received.

Further, yet another aspect of the present invention provides a computer-readable recoding medium recording a program executing a method, including receiving information needed for generating a personal barcode from at least one terminal, generating the personal barcode using the information needed for generating the received personal barcode, registering and managing the generated barcode, the information needed for generating the personal barcode, and user information, for each person, searching for the personal barcode for a corresponding user when a signal for a request of an integrated barcode and a product barcode are received from the terminal, generating the integrated barcode by mapping the searched personal barcode with a product barcode for at least one product, and transmitting the generated integrated barcode to the terminal.

Moreover, yet another aspect of the present invention provides a computer-readable recoding medium recording a program executing a method, including registering information needed for generating a personal barcode in a service apparatus in order to receive a payment service using an integrated barcode, transmitting a signal for a request of the integrated barcode to the service apparatus and recognizing a barcode for a specific product according to a manipulation of a user when there is an input for the request of the integrated barcode from the user, and transmitting the recognized product barcode together with the signal for the request of the integrated barcode, and storing the integrated barcode when the integrated barcode is received from the service apparatus, and performing a payment using the received integrated barcode which is received.

According to the present invention, a convenient payment service can be performed using one integrated barcode when performing a payment by providing an integrated barcode combining card information for getting a card benefit and product information of a product which is desired to be purchased together with the card information for a payment when a customer purchases a product in a specific market.

Further, since a discount and a payment for products of various companies using one integrated barcode are simultaneously performed, a more rapid and convenient payment service can be performed when purchasing the product.

Moreover, security can be increased by using the integrated barcode having a feature which is changed according to a time.

DETAILED DESCRIPTION

Hereinafter, exemplary embodiments of the present invention will be described in detail with reference to the accompanying drawings. A detailed description of well-known functions or configurations which can obscure a subject matter of the present invention in the following descriptions and accompanying drawings will be omitted. Further, throughout the drawings, it will be understood that like elements are designated by like reference numerals.

Based on a principle in which the terminology and vocabulary used below to describe the specification and claims should not be construed in general or dictionary meanings, and may be defined as concepts of the terminology to describe the invention in the best way, the terminology and vocabulary should be interpreted in the meanings and the concepts corresponding to a technical spirit of the invention. Accordingly, constructions shown in the embodiments and drawings described in the specification are merely the preferred embodiments, and since the constructions do not show all of the technical spirit of the present invention, it will be understood that there are various equivalents and modifications capable of replacing them at the time of filing an application.

Hereinafter, a terminal according to exemplary embodiments of the present invention will be described as a representative example of a mobile communication terminal connected to a communication network and being capable of performing a payment service using an integrated barcode, but is not limited thereto, and may be applied to various kinds of terminals such as all information communication devices, a multimedia terminal, a wired terminal, a fixed-type terminal, an Internet protocol (IP) terminal, etc. Further, the terminal may be used as a mobile terminal having various mobile communication specifications such as a handheld phone, a portable multimedia player (PMP), a mobile Internet device (MID), a smart phone, a desktop computer, a tablet personal computer (PC), a notebook computer, a netbook computer, and an information communication device, etc.

Hereinafter, a payment service system using an integrated barcode according to an exemplary embodiment of the present invention will be described.

Figure 1:
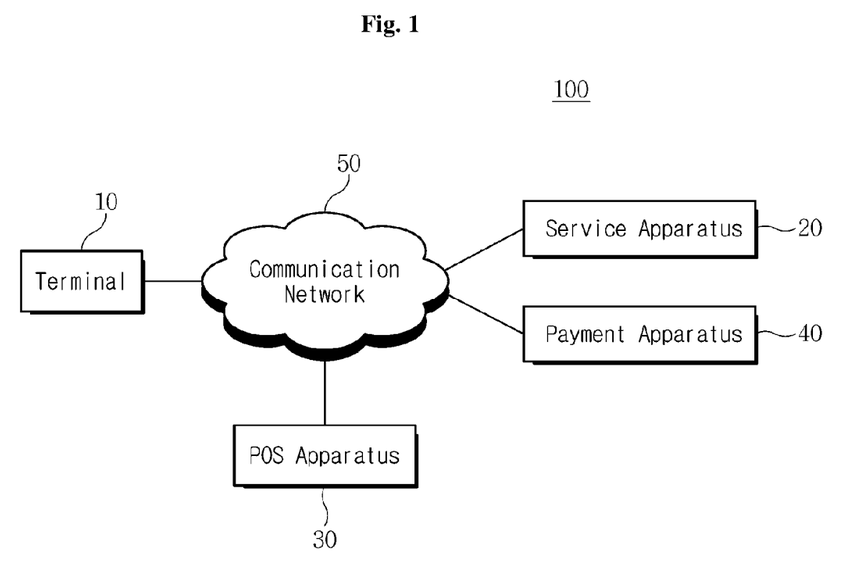
FIG. 1 is a diagram illustrating a configuration of a payment service system using an integrated barcode according to an exemplary embodiment of the present invention.

FIG. 1 is a diagram illustrating a configuration of a payment service system using an integrated barcode according to an exemplary embodiment of the present invention.

Referring to FIG. 1, the payment service system using the integrated barcode according to an exemplary embodiment of the present invention may include a terminal 10, a service apparatus 20, a point-of-sale (POS) apparatus 30, a payment apparatus 40, and a communication network 50.

A processor installed in the terminal 10 or the service apparatus 20 according to an exemplary embodiment of the present invention may process a program instruction for executing a method according to an exemplary embodiment of the present invention. In one embodiment, the processor may be a single-threaded processor, and in another embodiment, the processor may be a multi-threaded processor. Further, the processor may process an instruction stored in a memory or a storage device.

The communication network 50 may perform a series of data transceiving operations for a data transmission and an information exchange between the terminal 10 and the service apparatus 20. Particularly, the communication network 50 may be various types of communication networks, and for example, may use a wireless communication method such as a wireless local area network (WLAN), wireless fidelity (Wi-Fi), wireless broadband Internet (WiBro), worldwide interoperability for microwave (WiMax), a high speed downlink packet access (HSDPA), etc., or a wired communication method such as an Ethernet, a x-digital subscriber line (xDSL) (an asymmetric DSL (ADSL), a very high-data rate DSL (VDSL)), a hybrid fiber coax (HFC), a fiber to the curb (FTTC), a fiber to the home (FTTH), etc.

Meanwhile, the communication network 50 is not limited thereto described above, and may include all kinds of communication methods which are well-known or will be developed later.

The terminal 10 may be connected to the service apparatus 20, the POS apparatus 30, and the payment apparatus 40 through the communication network 50, and transceive every data related to the provision of the integrated barcode for a payment service. Particularly, the terminal 10 according to an exemplary embodiment of the present invention may register information needed for generating a personal barcode in the service apparatus 20. After that, when there is an input for a request of a barcode from a user, the terminal 10 may receive the integrated barcode from the service apparatus 20 after requesting the integrated barcode from the service apparatus 20, and perform the payment service using the integrated barcode. In this case, the personal barcode may include an additional payment information code applying discount means information corresponding to discount card information for which a corresponding user registered, point accumulation information for each card, and mileage accumulation information, and a payment means code applying payment means information corresponding to a credit card, a check card, a gift card, and account transfer information. Also, the product barcode refers to a barcode including information related to a specific product. Further, the integrated barcode refers to a barcode which is generated by mapping the personal barcode with the product barcode. In this case, the generated integrated barcode may be a barcode which is valid only during a preset period. Accordingly, it may be preferably to map a valid barcode together by setting the personal barcode and the product barcode as fixed values when generating the integrated barcode, and generating the valid barcode which is dynamically changed to represent whether the integrated barcode is valid.

That is, the integrated barcode according to an exemplary embodiment of the present invention may be a barcode which is valid only during the preset time, and be updated for each preset period. For this, the personal barcode and the product barcode which are fixed values may be included, and the valid barcode which is dynamically changed may be included. In this case, the valid barcode may be randomly generated according to a program which is preset.

Further, the terminal 10 may recognize the product barcode of a product which a user desires to purchase according to a request of the user when requesting the integrated barcode, and transmit the recognized product barcode to the service apparatus 20.

Further, the terminal 10 may receive the integrated barcode generated by mapping the product barcode with the personal barcode from the service apparatus 20, and perform the payment through the POS apparatus 30 and the payment apparatus 40 using the received integrated barcode.

The service apparatus 20 may be connected to the terminal 10, the POS apparatus 30, and the payment apparatus 40 through the communication network 50, and transceive all data related to providing the integrated barcode for the payment service.

Particularly, the service apparatus 20 according to an exemplary embodiment of the present invention may receive user information needed for generating the personal barcode when a request for receiving an integrated barcode service is received from the terminal 10, generate the personal barcode, and register the user information. Here, the personal barcode may include the additional payment information code applying the discount means information corresponding to discount card information for which a corresponding user registered, the point accumulation information, and the mileage accumulation information, and the payment means code applying the payment means information corresponding to the credit card, the check card, the gift card, and the account transfer information.

In this case, when registering the integrated barcode service, the service apparatus 20 may request priority information related to a customer's use (a discount, a mileage, a payment, etc.) preference with respect to the payment means information when requesting the information needed for generating the personal barcode, receive the priority information, and set a payment ranking. That is, the service apparatus 20 may set the priority with respect to the payment means which the user prefers, confirm a discount card preference according to whether there are remaining points, and set the payment ranking.

The service apparatus 20 may store and manage the personal barcode issued for each user, the information needed for generating the personal barcode transmitted from the terminal 10, and the user information.

The service apparatus 20 may receive the product barcode from the terminal 10 having a barcode recognition function which is able to recognize the barcode. Also, the service apparatus 20 may map an issued personal barcode with the product barcode for a specific product to generate the integrated barcode. In this case, the generated integrated barcode may be set to be valid only during a preset time. That is, the generated integrated barcode may be a barcode which is valid only during a preset period. Accordingly, when generating the integrated barcode, it may be desirable to map the valid barcode together by setting the personal barcode and the product barcode as fixed values, and generating the valid barcode which is dynamically changed for representing whether the integrated barcode is valid.

That is, the integrated barcode according to an exemplary embodiment of the present invention may be a barcode which is valid only during the preset time, and be updated for each preset period. For this, the personal barcode and the product barcode may be included as the fixed values, and the valid barcode which is dynamically changed may be included. In this case, the valid barcode may be randomly generated according to the preset program. The integrated barcode which is generated may be provided by being updated for each preset period until the payment is performed by the terminal 10.

The service apparatus 20 may provide the integrated barcode to the terminal 10. After that, the service apparatus 20 may interwork with the payment apparatus 40 when performing the payment service using the integrated barcode according to a request from the terminal 10.

The POS apparatus 30 may be installed in a franchise store, and provide the payment service by recognizing the integrated barcode according to the request from the terminal 10.

The payment apparatus 40 may be a server in which a payment institution, such as a financial institution, a credit card corporation, or a mobile communication corporation, performing authentication and payment approval works related to a mobile payment operates, and performs the authentication and payment approval works for the integrated barcode used by the terminal 10.

An internal configuration of the terminal for providing the payment service in the payment service system using the integrated barcode according to an exemplary embodiment of the present invention will be described in detail with reference to FIG. 2.

Figure 2:
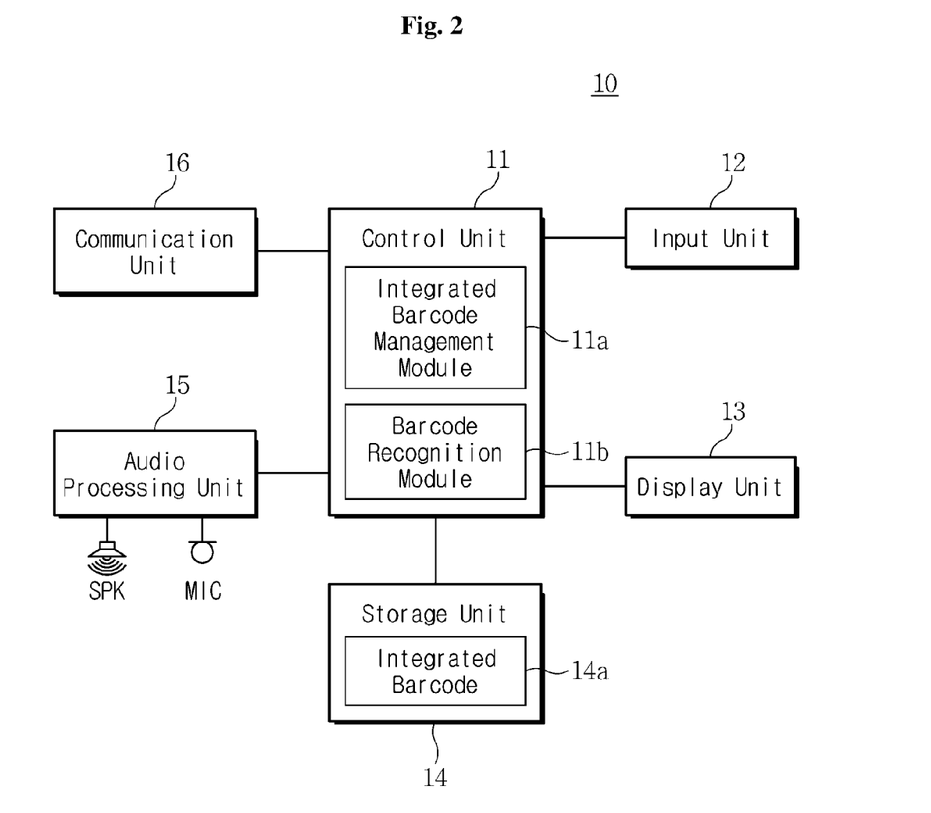
FIG. 2 is a block diagram illustrating a configuration of a terminal according to an exemplary embodiment of the present invention.

FIG. 2 is a block diagram illustrating a configuration of a terminal according to an exemplary embodiment of the present invention.

Referring to FIG. 2, the terminal 10 according to an exemplary embodiment of the present invention may include a control unit 11, an input unit 12, a display unit 13, a storage unit 14, an audio processing unit 15, and a communication unit 16. Here, the control unit 11 may include an integrated barcode management module 11a.

The input unit 12 may receive a variety of information such as numeral or character information, etc., and transmit a signal which is input in relation to a setting of various functions and a function control of the terminal 10 to the control unit 11. Further, the input unit 12 may include at least one of a keypad and a touch pad generating an input signal according to a touch or a manipulation of a user. In this case, the input unit 12 may be configured in the form of one touch panel (or a touch screen) together with the display unit 13, and simultaneously perform input and display functions. Further, the input unit 12 may be all kinds of input means which are capable of being developed later in addition to the input devices such as a keyboard, a keypad, a mouse, a joystick, etc. Particularly, the input unit 12 according to an exemplary embodiment of the present invention may sense all input signals related to providing the payment service using the integrated barcode, and transmit the sensed signals to the control unit 11.

The display unit 13 may display information related to a series of operation states and results, etc. which are generated while the terminal 10 performs a function. Further, the display unit 13 may display a menu of the terminal 10 and user data input by the user, etc. Here, the display unit 13 may be configured as a liquid crystal display (LCD), a thin film transistor LCD (TFT-LCD), a light emitting diode (LED), an organic LED (OLED), an active matrix OLED (AMOLED), a retina display, a flexible display, and a three-dimensional display, etc. In this case, when the display unit 13 is configured in the form of the touch screen, the display unit 13 may perform a portion or all of functions of the input unit 12. Particularly, the display unit 13 according to an exemplary embodiment of the present invention may output all information related to providing the payment service using the integrated barcode.

The storage unit 14 may be a device for storing data, include a main storage device and an auxiliary storage device, and store an application program needed for an operation of the function of the terminal 10. The storage unit 14 may largely include a program region and a data region. Here, when the terminal 10 activates each function in response to a request of the user, the terminal 10 may execute corresponding application programs according to the control of the control unit 11 to provide each function. Particularly, the storage unit 14 according to an exemplary embodiment of the present invention may store an operating system for booting up the terminal 10, a program for generating the personal barcode, a program for collecting the product barcode, a program for performing the payment service, etc. Further, the storage unit 14 may store the integrated barcode received from the service apparatus 20. Moreover, a pre-stored integrated barcode may be stored by being updated when receiving the integrated barcode for each preset period from the service apparatus 20.

The audio processing unit 15 may perform a function of transmitting an audio signal input from a speaker (SPK) or a microphone (MIC) for playing and outputting the audio signal to the control unit 11. The audio processing unit 15 may convert the audio signal of an analog form input through the microphone into the audio signal of a digital form, and transmit the audio signal of the digital form to the control unit 11. Further, the audio processing unit 15 may convert the audio signal of the digital form output from the control unit 11 into the audio signal of the analog form, and output the audio signal of the analog form through the speaker. Particularly, the audio processing unit 15 according to an exemplary embodiment of the present invention may output a sound effect or execution sound related to the provision of the payment service using the integrated barcode.

The communication unit 16 may perform a function of transceiving data with the service apparatus 20, the POS apparatus 30, and the payment apparatus 40 through the communication network 50. Here, the communication unit 16 may include a radio frequency (RF) transmission means of up-converting and amplifying a frequency of a signal which is transmitted, and an RF reception means of low-noise amplifying and down-converting the signal which is received, etc. The communication unit 16 may include at least one of a wireless communication module (not shown) and a wired communication module (not shown). The wireless communication module may have a configuration for transceiving data according to a wireless communication method, and when the terminal 10 uses the wireless communication method, the terminal 10 may transceive data with the service apparatus 20 using any one among a wireless network communication module, a wireless LAN communication module, and a wireless personal area network (WPAN) communication module. Further, the wired communication module may be connected to the communication network 50 through wired communication, and transceive data with the service apparatus 20. Particularly, the communication unit 16 according to an exemplary embodiment of the present invention may communicate with the service apparatus 20 and the POS apparatus 30, and transceive data related to the payment service using the integrated barcode.

The control unit 11 may be a processing device capable of driving the operating system and each component. Particularly, the control unit 11 according to an exemplary embodiment of the present invention may register the information needed for generating the personal barcode in the service apparatus 20. In this case, when registering the integrated barcode service, the control unit 11 may transmit information for a registration input through the input unit 12 by the user to the service apparatus 20 through the communication unit 16. In this case, the information for the registration may be the information needed for generating the personal barcode, and include at least one among the discount card information, the point accumulation information for each card, the mileage accumulation information, and the payment means information corresponding to the credit card, the check card, the gift card, and the account transfer information.

When there is an input for the request of the integrated barcode from the user, the control unit 11 may transmit the integrated barcode request to the service apparatus 20 through the communication unit 16, receive the integrated barcode from the service apparatus 20, and use the integrated barcode when performing the payment. In this case, the integrated barcode received from the service apparatus 20 may be provided as set to be valid only during a preset time. That is, the integrated barcode may be set to not to be useable when the preset time is passed. Further, the integrated barcode may be received from the service apparatus 20 for each preset period until the payment is performed by the terminal 10, and the received barcode may be stored by updating the stored integrated barcode.

Further, the control unit 11 may recognize the product barcode of the specific product, and transmit the recognized product barcode to the service apparatus 20. Moreover, the control unit 11 may receive the integrated barcode generated by mapping the product barcode with the personal barcode from the service apparatus 20, and perform the payment through the POS apparatus 20 and the payment apparatus 40 using the integrated barcode.

In order to perform the function of the terminal 10 more effectively, the control unit 11 according to an exemplary embodiment of the present invention may include the integrated barcode management module 11a and a barcode recognition module 11b. Further, the integrated barcode management module 11a may manage the integrated barcode received from the service apparatus 20, and control an operation of the payment service using the integrated barcode stored when performing the payment service using the integrated barcode.

The barcode recognition module 11b may recognize the product barcode for a specific product. Here, the barcode recognition module 11b may use a barcode reader or a camera in order to recognize the barcode, and the recognized information may be provided to the service apparatus 20.

Next, an internal configuration of the service apparatus for providing the payment service in the payment service system using the integrated barcode according to an exemplary embodiment of the present invention will be described in detail with reference to FIG. 3.

Figure 3:
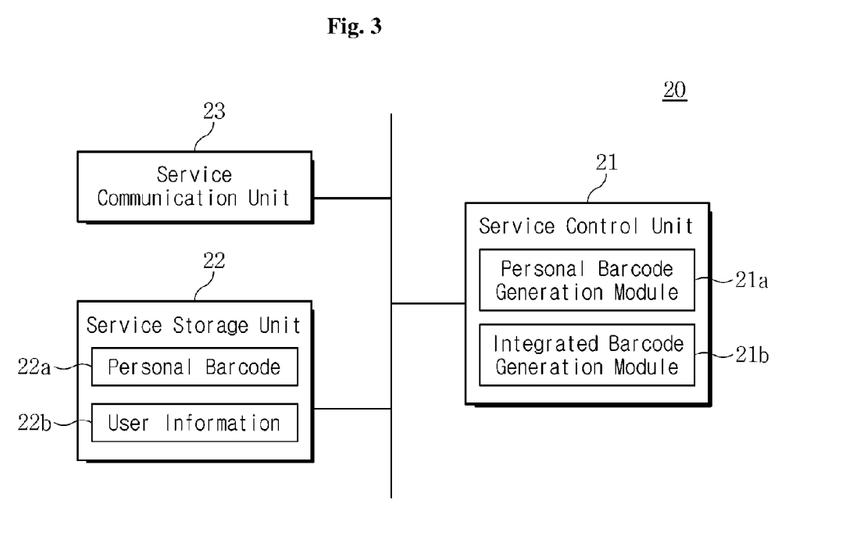
FIG. 3 is a block diagram illustrating a configuration of a service apparatus according to an exemplary embodiment of the present invention.

FIG. 3 is a block diagram illustrating a configuration of a service apparatus according to an exemplary embodiment of the present invention.

Referring to FIG. 3, the service apparatus 20 according to an exemplary embodiment of the present invention may include a service control unit 21, a service storage unit 22, and a service communication unit 23. Here, the service control unit 21 may include a personal barcode generation module 21a, and an integrated barcode generation module 21b.

The service communication unit 23 may perform a function of transceiving all data related to providing the payment service using the integrated barcode with the terminal 10, the POS apparatus 30, and the payment apparatus 40 through the communication network 50.

The service storage unit 22 may store all programs according to an execution of a function of the service apparatus 20. Particularly, the service storage unit 22 according to an exemplary embodiment of the present invention may store a program for generating the personal barcode for each user, and a program for generating the integrated barcode by mapping the personal barcode with the product barcode, etc. Moreover, the service storage unit 22 may store the personal barcode 22a and the user information 22b issued for each user by reflecting the priority information related to the user's use preference with respect to the discount card information, the point accumulation information for each card, and the mileage accumulation information, and the payment means information corresponding to the credit card, the check card, the gift card, the account transfer information. In this case, the user information may include personal information such as a user terminal number, a user name, a user address, etc.

The service control unit 21 may be a processing device capable of driving an operating system and each component. Particularly, the service control unit 21 according to an exemplary embodiment of the present invention may receive the information needed for generating the personal barcode from the terminal 10. Here, the service control unit 21 may request one or more among the discount card information, the point accumulation information for each card, and the mileage accumulation information, and the payment means information corresponding to the credit card, the check card, the gift card, the account transfer information. Further, the service control unit 21 may receive corresponding information from the terminal 10 as a response to the request.

The service control unit 21 may confirm the priority information related to the user's use preference with respect to the payment means information from the terminal 10 according to a setting, and set the payment ranking by reflecting the priority information which is preset. That is, the service control unit 21 may set the priority with respect to the payment means which the user prefers, confirm a preference of the discount card according to whether there are remaining points, and set the payment ranking.

The service control unit 21 may generate the personal barcode by combining the received information.

Further, the service control unit 21 may generate the integrated barcode by mapping the personal barcode with the received product barcode according to the request of the integrated barcode from the terminal 10. In this case, the integrated barcode which is generated may be set to be valid only during a preset time period. That is, the integrated barcode which is generated may be a barcode which is valid only during a preset period. Accordingly, when generating the integrated barcode, it may be desirable to map the valid barcode together by setting the personal barcode and the product barcode as fixed values, and generating the valid barcode which is dynamically changed for representing whether the integrated barcode is valid. The integrated barcode according to an exemplary embodiment of the present invention may be the barcode which is valid only during a preset time, and be updated for each preset period. For this, the personal barcode and the product barcode may be included as fixed values, and the valid barcode which has dynamically changed value may be included. In this case, the valid barcode may be randomly generated according to the preset program.

The service control unit 21 may provide the integrated barcode to the terminal 10. After that, the service control unit 21 may interwork with the payment apparatus 40 when performing the payment service using the integrated barcode according to the request from the terminal 10.

In order to perform the function of the service apparatus 20 more effectively, the service control unit 21 according to an exemplary embodiment of the present invention may include the personal barcode generation module 21a and the integrated barcode generation module 21b. Particularly, the personal barcode generation module 21a may collect the discount information, the mileage information, and the payment means information for performing the payment for the product for each user, generate the personal barcode for each customer based on the collected information, and provide the generated personal barcode to the terminal 10. Here, the personal barcode may be configured as the additional payment information code and the payment means code, and the additional payment information code may include the discount card information and the mileage accumulation card information, etc. which are applied to the product cost, and the payment means code may include the credit card information, the check card information, the gift card information, the prepaid card information for the payment of the product, and bank and account information for the account transfer, etc. Further, the integrated barcode generation module 21b may generate the integrated barcode by mapping and combining the personal barcode for each user and the product barcode for the specific product transmitted from the terminal 10.

Meanwhile, a memory installed in the terminal 10 or the service apparatus 20 may store information therein. In one embodiment, the memory may be a computer-readable medium. In another embodiment, the memory may be a volatile memory device, and in still another example, the memory may be a non-volatile memory device. In one embodiment, the storage device may be a computer-readable medium. In various embodiments, the storage device may include a hard disk device, an optical disk device, or any other mass storage device.

While a configuration of an exemplary embodiment device is described in this specification and drawings, the implementation of functional operations and subjects described in this specification may be implemented as a different form of digital electronic circuit, as computer software, firmware, or hardware including a configuration disclosed in this specification and equivalents thereof, or in a combination of one or more thereof. The implementation of the subject described in this specification may be implemented as one or more computer programs, for example, one or more modules related to a computer program instruction encoded on a program storage medium for controlling the operation of the apparatus or being executed by the apparatus according to the present invention. As an example of the computer-readable medium may be a storage device which is readable by a machine, a storage board which is readable by the machine, a memory device, a composite of materials influencing a radio wave signal which is readable by the machine, or a combination of one or more thereof.

Figure 4:
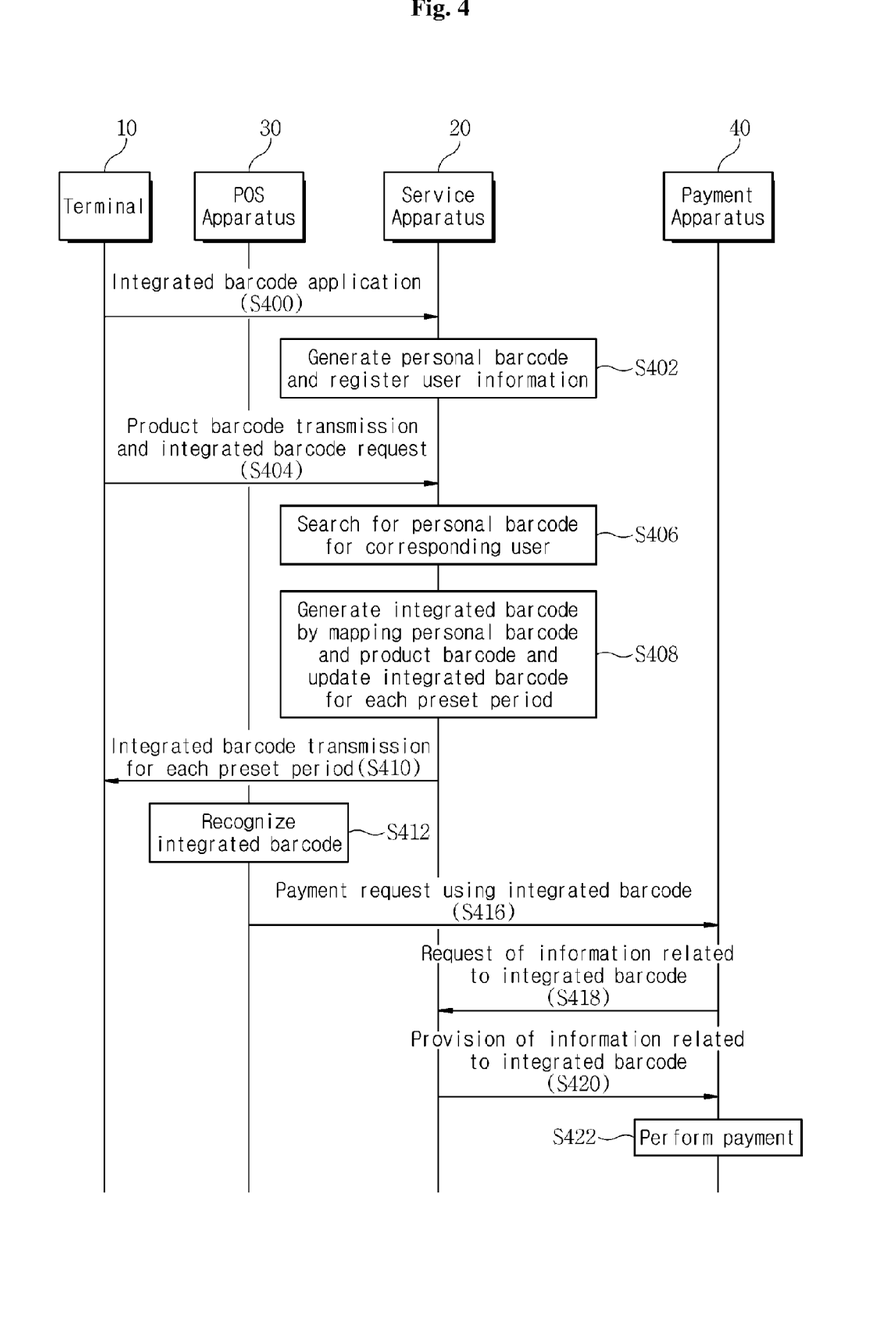
FIG. 4 is a flowchart for describing an operation between components for providing a payment service using an integrated barcode in a payment service system according to one exemplary embodiment of the present invention.

FIG. 4 is a flowchart for describing an operation between components for providing a payment service using an integrated barcode in a payment service system according to one exemplary embodiment of the present invention.

Referring to FIG. 4, the terminal 10 may apply the integrated barcode service to the service apparatus 20 according to the input of the user. In this case, information needed for generating the personal barcode may be provided when applying for the integrated barcode service (S400).

The service apparatus 20 may generate the personal barcode using the information needed for generating the personal barcode received from the terminal 10, and register and manage the generated personal barcode, the information needed for generating the personal barcode, and user information, for each person (S402). Since the generation of the personal barcode is described in detail with reference to FIG. 3, a detailed description thereof will be omitted.

In a state that the application and the registration of the payment service are completed by the user which desires to receive the payment service using the integrated barcode, the terminal 10 may transmit a signal for the request of the integrated barcode to the service apparatus 20 when the input for the request of the integrated barcode is received from the user. In this case, the terminal 10 may recognize the barcode for the specific product according to the manipulation of the user, and transmit the recognized product barcode together with the request signal.

The service apparatus 20 may search for the personal barcode for a corresponding user.

After that, the service apparatus 20 may generate the integrated barcode by mapping the searched personal barcode with the received product barcode, update the integrated barcode for each preset period, and transmit the integrated barcode to the terminal 10 for each preset period (S408, S410). In this case, the integrated barcode which is generated may be a barcode which is valid only during a preset period. Accordingly, when generating the integrated barcode, it may be desirable to map the valid barcode together by setting the personal barcode and the product barcode as fixed values, generating the valid barcode which is dynamically changed for representing whether the integrated barcode is valid.

That is, the integrated barcode according to the present invention may be a barcode which is valid only during a preset time, and be updated for each preset period. For this, the personal barcode and the product barcode which are fixed values may be included, and the valid barcode which has a dynamically changed value may be included. In this case, the valid barcode may be randomly generated according to a preset program. The integrated barcode which is generated may be provided by being updated for each preset period until the payment is performed by the terminal 10.

Meanwhile, the terminal 10 may store the received integrated barcode.

Further, when the POS apparatus 30 requests the payment to the payment apparatus 40 after recognizing the integrated barcode displayed on the terminal 10, the payment apparatus 40 may request information related to the integrated barcode through the service apparatus 20.

Further, the service apparatus 20 may confirm the personal barcode, the product barcode, and the valid barcode through the requested integrated barcode. In this case, the service apparatus 20 may confirm whether the currently requested integrated barcode is the valid barcode using the valid barcode, and when the integrated barcode is the valid barcode, the service apparatus 20 may transmit the discount means information corresponding to the discount card information, the point accumulation information, and the mileage accumulation information which are stored corresponding to the personal barcode, and the payment means information corresponding to the credit card, the check card, the gift card, the account transfer information as the information related to the integrated barcode to the payment apparatus 40. In this case, when there is the priority information with respect to the payment means which the user prefers, or the information regarding the discount card preference according to whether there are remaining points, the service apparatus 20 may transmit the priority information and the information regarding the discount card preference together.

The payment apparatus 40 receiving the information related to the integrated barcode may perform the payment for the corresponding product.

In the exemplary embodiment of FIG. 4, an example in which the payment is performed through the POS apparatus 30 when performing the payment using the integrated barcode received by the terminal 10 is described, but the terminal 10 may perform the payment by directly requesting the payment through the payment apparatus 40.

Figure 5:
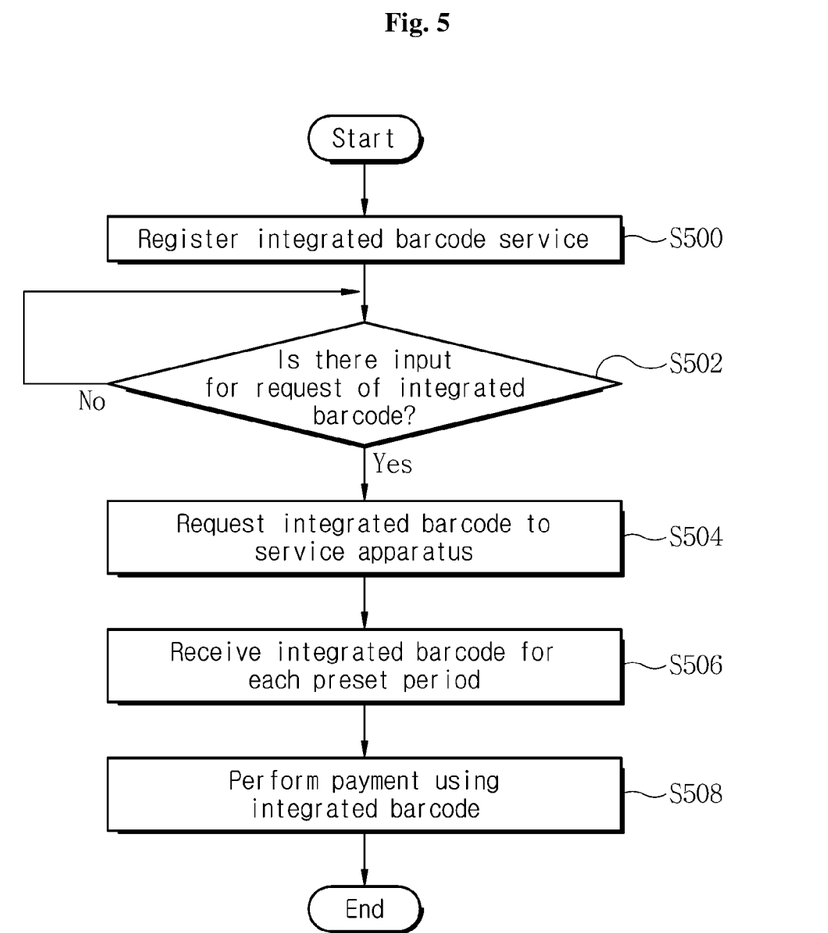
FIG. 5 is a flowchart for describing an operation method of a terminal for providing the payment service using the integrated barcode according to an exemplary embodiment of the present invention.

FIG. 5 is a flowchart for describing an operation method of a terminal for providing a payment service using an integrated barcode according to an exemplary embodiment of the present invention.

Referring to FIG. 5, the terminal 10 may request the registration for the integrated barcode service to the service apparatus 20 according to the input of the user. In this case, when applying for the integrated barcode service, the terminal 10 may provide information needed for generating the personal barcode (S500).

When an input for the request of the integrated barcode is received from the user, the terminal 10 may transmit a signal for the request of the integrated barcode to the service apparatus 20. In this case, the terminal 10 may recognize the barcode for the specific product according to the manipulation of the user, and transmit the recognized product barcode together with the request signal (S502, S504).

After that, when the integrated barcode is received from the service apparatus 20, the terminal 10 may store the received integrated barcode (S506). In this case, when the payment is not performed using the received integrated barcode, the terminal 10 may receive the integrated barcode which is periodically transmitted from the service apparatus 20, discard the stored integrated barcode, and store the received integrated barcode.

The terminal 10 may perform the payment using the stored integrated barcode. In this case, the payment may be performed through the POS apparatus 30 when performing the payment using the integrated barcode received by the terminal 10, and the terminal 10 may perform the payment by directly requesting the payment through the payment apparatus 40.

Figure 6:
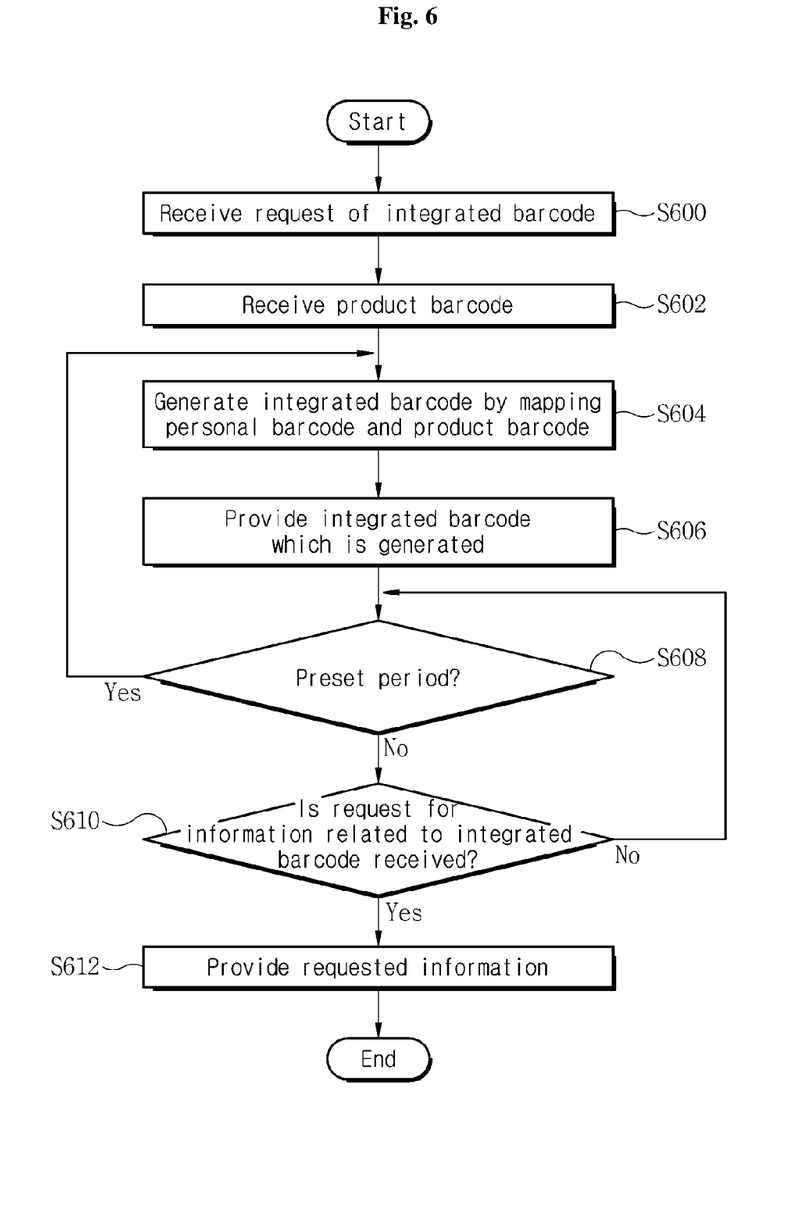
FIG. 6 is a flowchart for describing an operation method of a service apparatus for providing the payment service using the integrated barcode according to an exemplary embodiment of the present invention.

FIG. 6 is a flowchart for describing an operation method of a service apparatus for providing a payment service using an integrated barcode according to an exemplary embodiment of the present invention. In FIG. 6, an example of a state in which the terminal 10 is assumed to have previously performed the application for receiving the payment service using the integrated barcode through the service apparatus 20 will be described. The service apparatus 20 may generate the personal barcode using the information needed for generating the personal barcode from the terminal 10, and register and manage the generated barcode, the information needed for generating the personal barcode, and the user information, for each person.

Referring to FIG. 6, in a state in which the application and the registration for the payment service are completed by the user which desires to receive the payment service using the integrated barcode according to an exemplary embodiment of the present invention, the service apparatus 20 may search for the personal barcode for a corresponding user when receiving the signal for the request of the integrated barcode and the product barcode from the terminal 10 (S600 to S604).

Next, the service apparatus 20 may generate the integrated barcode by mapping the searched personal barcode with the product barcode, and transmit the integrated barcode which is generated to the terminal 10 (S606). In this case, the generated integrated barcode may be a barcode which is valid only during a preset period. Accordingly, when generating the integrated barcode, it may be desirable to map the personal barcode with the product barcode, and the valid barcode together by setting the personal barcode and the product barcode as fixed values, and generating the valid barcode which is dynamically changed for representing whether the integrated barcode is valid. That is, the integrated barcode according to an exemplary embodiment of the present invention may be a barcode which is valid only during a preset time, and by updated for each preset period. For this, the personal barcode and the product barcode may be included as fixed values, and the valid barcode which has a dynamically changed value may be included. In this case, the valid barcode may be randomly generated according to a preset program. The generated integrated barcode may be provided by being updated for each preset period until the payment is performed by the terminal 10.

Meanwhile, the service apparatus 20 may check whether a time in which the integrated barcode is updated, that is, the preset period elapsed (S608), and when the preset period has elapsed, the service apparatus 20 proceeds to the operation S604, generates the integrated barcode including the personal barcode, the received product barcode, and the valid barcode again to transmit to the terminal 10 (S606). In this case, the valid barcode may be randomly generated, and include another code different from an initially generated code.

However, when a request of the information related to the integrated barcode is received from the payment apparatus 40 before the preset period elapses in the operation S608, the service apparatus 20 may provide the requested information to the payment apparatus 40 (S610, S612). In detail, the service apparatus 20 may confirm the personal barcode, the product barcode, and the valid barcode through the requested integrated barcode, confirm whether the currently requested integrated barcode is a barcode which is valid using the valid barcode, and when the integrated barcode is the valid barcode, transmit the discount means information corresponding to the discount card information stored corresponding to the personal barcode, the point accumulation information for each card, the mileage accumulation information, and the payment means information corresponding to the credit card, the check card, the gift card, and the account transfer information as the information related to the integrated barcode to the payment apparatus 40. In this case, the service apparatus 20 may transmit the priority information and the information related to the discount card preference together when there is the priority information with respect to the payment means which the user prefers and the information related to the discount card preference according to whether remaining points exist.

Implementations of the various techniques described herein may be implemented in digital electronic circuitry, or in computer hardware, firmware, software, or in a combination thereof. Implementations may be implemented as a computer program product, for example, a computer program tangibly embodied in an information carrier, for example, in a storage device which is readable by a machine (computer-readable medium) or in a radio wave signal, for execution by, or to control the operation of, a data processing apparatus, for example, a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps may also be performed by, and an apparatus may be implemented as, special purpose logic circuitry, for example, a field programmable gate array (FGPA) or an application-specific integrated circuit (ASIC).

Processors suitable for the execution of a computer program include, by way of example, both general and special purpose microprocessors, and any one or more processor of any kind of digital computer. Generally, a processor will receive instructions and data from a read-only memory (ROM), a random access memory (RAM), or both. Elements of a computer may include at least one processor for executing instructions and one or more memory devices for storing instructions and data. Generally, a computer also may include, or be operatively coupled to receive data from, transfer data to, or transceive data with, one or more mass storage devices for storing data, for example, magnetic, magneto-optical disks, or optical disks. Information carriers suitable for embodying computer program instructions and data may include magnetic media such as a hard disk, a floppy disk, and a magnetic tape, optical media such as a compact disk read-only memory (CD-ROM) and a digital versatile disc read-only memory (DVD-ROM), magneto-optical media such as a floptical disk, and semiconductor memory devices such as a ROM, a RAM, a flash memory, an erasable programmable ROM (EPROM), an electrically erasable programmable ROM (EEPROM), etc. The processor and the memory can be supplemented by, or incorporated in special-purpose logic circuitry.

While this specification contains many specific implementation details, these should not be construed as limitations on the scope of any invention or of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features can be described above as acting in certain combinations, and can even initially be claimed as such, one or more features from a claimed combination can, in some cases, be excluded from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations need be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

On the other hand, the embodiments of the invention disclosed in the specification and drawings are presented merely as a specific example for clarity and are not intended to limit the scope of the invention. It will be apparent to those of ordinary skill in the art that other modifications based on the technical concept of the present invention, in addition to the embodiments disclosed herein, can be carried out.

The present invention may generate an integrated barcode by mapping a personal barcode with a product barcode for a specific product, provide the integrated barcode which is dynamically changed according to a time when performing a payment using the integrated barcode, and thus increase security. Further, the payment may be conveniently performed using one integrated barcode when performing the payment, and also the payment may be performed more rapidly and conveniently since the discount and the payment for products of various companies are simultaneously performed using one integrated barcode. Accordingly, there are enough possibilities of selling or marketing, and there is also industrial applicability in a degree capable of being practically implemented, the present invention has industrial applicability.

In this specification, exemplary embodiments of the present invention have been classified into the first, second and third exemplary embodiments and described for conciseness. However, respective steps or functions of an exemplary embodiment may be combined with those of another exemplary embodiment to implement still another exemplary embodiment of the present invention.

What is claimed is:

1. A service apparatus, comprising:
    a service communication unit configured to
        communicate with at least one terminal and a payment apparatus, and
        transmit and receive data related to a payment service; and
    a control unit configured to
        receive, from the terminal, user information of the terminal, a product barcode for at least one product, and a request signal for an integrated barcode,
        generate a valid barcode randomly,
        generate the integrated barcode by combining a personal barcode corresponding to the received user information of the terminal, the received product barcode, and the valid barcode,
        transmit the generated integrated barcode to the terminal,
        receive, from the payment apparatus, payment-related information using the integrated barcode for the terminal during a preset period,
        check, by using the valid barcode, whether the received payment-related information is valid, and
        transmit, when the payment-related information is valid, to the payment apparatus, the user information of the terminal corresponding to the personal barcode,
    wherein the control unit configure to
        regenerate, when the payment-related information is not received from the payment apparatus during the preset period, the valid barcode for next preset period,
        update the integrated barcode by combining the personal barcode, the product barcode and the regenerated valid barcode, and
        transmit the updated integrated barcode periodically to the terminal until the payment-related information is received from the payment apparatus.

2. The service apparatus of claim 1, wherein the control unit is configured to, when the user information is received from the terminal, generate the personal barcode based on the received user information.

3. The service apparatus of claim 1, wherein
    the personal barcode includes an additional payment information code and a payment means code,
    the additional payment information code includes at least one of discount card information applied to a purchase cost and mileage accumulation card information, and
    the payment means code includes at least one among credit card information, check card information, gift card information, prepaid card information, and bank and account information for account transfer, for a product payment.

4. The service apparatus of claim 1, further comprising:
    a service storage unit configured to
        store each personal barcode generated for each user and each user information for each user of the terminal, based on priority information related to a user's preference of use with respect to discount card information, point accumulation information for each card, mileage accumulation information, and payment means information corresponding to a credit card, a check card, a gift card, account transfer information, and bank and account information for account transfer.

5. A payment service method performed by a service apparatus, the payment service method comprising:
    receiving, from a terminal, user information of the terminal, a request signal for an integrated barcode, and a product barcode for at least one product;
    generating a valid barcode randomly;
    generating an integrated barcode by combining a personal barcode corresponding to the received user information of the terminal, the received product barcode, and the valid barcode;
    transmitting the generated integrated barcode to the terminal;
    receiving, from a payment apparatus, payment-related information using the integrated barcode for the terminal during a preset period;
    checking, by using the valid barcode, whether the payment-related information is valid; and
    transmitting, when the payment-related information is valid, to the payment apparatus, the user information of the terminal corresponding to the personal barcode,
    wherein the transmitting the integrated barcode further comprises,
        when the payment-related information is not received from the payment apparatus during the preset period, regenerating the valid barcode for next preset period,
        updating the integrated barcode by combining the personal barcode, the product barcode and the regenerate valid barcode, and
        transmitting the updated integrated barcode periodically to the terminal until the payment-related information is received from the payment apparatus.

6. The payment service method of claim 5, wherein the receiving the request signal comprises:
    receiving, from the terminal, the user information;
    generating the personal barcode using the received user information;
    storing the generated personal barcode corresponding to the user information; and
    receiving, from the terminal, the request signal and the product barcode.

7. The payment service method of claim 6, wherein the receiving the user information comprises:
    receiving, from the terminal, priority information related to a user's preference of use with respect to payment means information; and
    setting a payment ranking based on the received priority information.

8. The payment service method of claim 5,
    wherein the payment-related information comprises at least one of
        discount means information corresponding to discount card information,
        point accumulation information for each card,
        mileage accumulation card information, and payment means information corresponding to a credit card, a check card, a gift card, and account transfer information.

9. The payment service method of claim 8, wherein the payment-related information further comprises priority information with respect to a payment means which a user prefers, or information related to discount card preference according to whether remaining points exist.

10. A non-transitory computer-readable recoding medium recording a program, executing the payment service method of claim 5.

* * * * *